US012557802B2

(12) United States Patent (10) Patent No.: US 12,557,802 B2
Oogose et al. (45) Date of Patent: Feb. 24, 2026

(54) SOUND GENERATION MECHANISM AND DUAL-BEARING REEL FOR FISHING USING THE SAME

(71) Applicant: Shimano Inc., Sakai City (JP)

(72) Inventors: Hiroki Oogose, Sakai City (JP); Takeshi Ikuta, Sakai City (JP); Kunio Takechi, Sakai City (JP)

(73) Assignee: SHIMANO INC., Sakai City (JP)

( * ) Notice: Subject to any disclaimer, the term of this patent is extended or adjusted under 35 U.S.C. 154(b) by 227 days.

(21) Appl. No.: 18/478,164

(22) Filed: Sep. 29, 2023

(65) Prior Publication Data

US 2024/0138387 A1 May 2, 2024

(30) Foreign Application Priority Data

Oct. 31, 2022 (JP) ................................ 2022-174566

(51) Int. Cl.
*A01K 89/01* (2006.01)
*A01K 89/015* (2006.01)

(52) U.S. Cl.
CPC ................................ *A01K 89/0178* (2015.05)

(58) Field of Classification Search
CPC .............. A01K 89/0179; A01K 89/018; A01K 89/0181
See application file for complete search history.

(56) References Cited

U.S. PATENT DOCUMENTS

| | | | | |
|---|---|---|---|---|
| 219,328 | A | * 9/1879 | Vom Hope | A01K 89/033 |
| | | | | 242/303 |
| 284,217 | A | * 9/1883 | Malleson | A01K 89/0179 |
| | | | | 242/249 |
| 996,348 | A | * 6/1911 | Kramer | A01K 89/018 |
| | | | | 242/308 |
| 1,639,629 | A | * 8/1927 | Case | A01K 89/0181 |
| | | | | 242/308 |
| 1,832,421 | A | * 11/1931 | Pflueger | A01K 89/046 |
| | | | | 242/298 |
| 1,836,869 | A | * 12/1931 | Pflueger | A01K 89/033 |
| | | | | 242/308 |

(Continued)

FOREIGN PATENT DOCUMENTS

| | | | | | |
|---|---|---|---|---|---|
| GB | 1017055 | A | * 1/1966 | | A01K 89/009 |
| JP | 2000279074 | A | * 10/2000 | | A01K 89/033 |

(Continued)

*Primary Examiner* — Emmanuel M Marcelo
(74) *Attorney, Agent, or Firm* — United IP Counselors, LLC

(57) ABSTRACT

Provided is a sound generation mechanism including a rotation member configured to rotate together with a spool and including a recess-protrusion portion formed on an outer peripheral surface along a circumferential direction of the rotation member; a contacting member moveably supported relative to a pivot shaft and configured to elastically move relative to the recess-protrusion portion of the rotation member; a biasing member configured to bias the contacting member to a predetermined position; and a restriction member configured to restrict movement of the contacting member in an axial direction of the pivot shaft. With this mechanism, detachment or damage of a retaining ring due to movement of a contacting member can be suppressed.

8 Claims, 10 Drawing Sheets

(56) References Cited

U.S. PATENT DOCUMENTS

| 1,899,914 A * | 2/1933 | Pflueger | A01K 89/0181 |
| | | | 242/308 |
| 1,958,919 A * | 5/1934 | Kovalovsky | A01K 89/018 |
| | | | 242/321 |
| 2,436,422 A * | 2/1948 | Dashman | A01K 89/015 |
| | | | 242/308 |
| 2,591,204 A * | 4/1952 | Schnepel | A01K 89/051 |
| | | | 242/252 |
| 2,601,582 A * | 6/1952 | Zientowski | A01K 89/0155 |
| | | | 188/74 |
| 2,633,308 A * | 3/1953 | Zientowski | A01K 89/051 |
| | | | 242/308 |
| 2,783,001 A * | 2/1957 | Grice | A01K 89/018 |
| | | | 242/139 |
| 4,728,054 A * | 3/1988 | Pisapio | A01K 89/016 |
| | | | 242/270 |
| 5,161,750 A * | 11/1992 | Hitomi | A01K 89/033 |
| | | | 242/295 |
| 2023/0076678 A1 * | 3/2023 | Pulkrabek | A01K 89/0179 |
| 2023/0165233 A1 * | 6/2023 | Shimizu | A01K 89/0111 |

FOREIGN PATENT DOCUMENTS

| JP | 2010017098 A | | 1/2010 | |
| JP | 2011019427 A | * | 2/2011 | A01K 89/033 |
| JP | 5349349 B2 | * | 11/2013 | A01K 89/0179 |
| JP | 2014176359 A5 | * | 4/2016 | A01K 89/01 |
| KR | 200357360 Y1 | * | 7/2004 | A01K 89/0179 |
| KR | 20120010564 A | * | 2/2012 | A01K 89/015 |
| KR | 20130004510 U | * | 7/2013 | A01K 89/0179 |

* cited by examiner

SOUND GENERATION MECHANISM AND DUAL-BEARING REEL FOR FISHING USING THE SAME

CROSS-REFERENCE TO RELATED APPLICATIONS

This application claims priority to Japanese Application No. 2022-174566, filed Oct. 31, 2022. The contents of that application are incorporated by reference herein in their entirety.

TECHNICAL FIELD

The present invention relates to a sound generation mechanism and a dual-bearing reel for fishing using the sound generating mechanism.

BACKGROUND ART

In the field of dual-bearing reels for fishing, a known configuration of a sound generation mechanism that generates sound when a spool rotates includes: a ring-shaped rotation member that rotates together with the spool and includes a recess-protrusion portion formed on an outer peripheral surface along a circumferential direction of the ring-shaped rotation member; a sound generation claw (i.e., a contacting member) that is moveably supported relative to a pivot shaft and generates sound by elastically moving relative to the recess-protrusion portion of the rotation member; a biasing member that biases the sound generation claw to a predetermined position; and a retaining ring that restricts detachment of the contacting member in an axial direction of the pivot shaft (for example, see JP 2010-17098A).

BRIEF SUMMARY

However, increasing a biasing force of the biasing member causes uncontrollable movement (rattling) of the sound generation claw to increase, and consequently the load on the retaining ring that presses the sound generation claw is also increased, which causes a problem in that the retaining ring becomes detached or damaged.

The present invention has been conceived in view of such circumstances, and an object thereof is to provide a sound generation mechanism and a dual-bearing reel for fishing in which detachment of or damage to the retaining ring due to movement of the contacting member can be suppressed.

(1) A first aspect of a sound generation mechanism according to the present invention is a sound generation mechanism provided to a dual-bearing reel for fishing and configured to generate sound when the spool rotates, the mechanism including: a rotation member configured to rotate together with the spool and including a recess-protrusion portion formed on an outer peripheral surface along a circumferential direction of the rotation member; a contacting member moveably supported relative to a pivot shaft and configured to elastically move relative to the recess-protrusion portion of the rotation member; a biasing member configured to bias the contacting member to a predetermined position; and a restriction member configured to restrict movement of the contacting member in an axial direction of the pivot shaft.

With the first aspect of the sound generation mechanism according to the present invention, the contacting member, which is biased by the biasing member to a swing center position, is held in a state in which movement in the axial direction of the pivot shaft is restricted by the restriction member. Because of this, the load of the contacting member does not directly act on the retaining ring. As described above, according to the present invention, the biasing force of the biasing member applied to the contacting member can be reduced to be small, so that large uncontrollable swinging of the contacting member is suppressed by the restriction member. As a result, detachment of or damage to the retaining ring by the movement of the contacting member in the axial direction is suppressed, thereby making it possible to improve the durability of the sound generation mechanism.

(2) In the sound generation mechanism of a second aspect of the present invention according to the first aspect, the restriction member preferably includes a first restriction part configured to restrict movement of the contacting member in one direction along the axial direction of the pivot shaft and a second restriction part configured to restrict movement of the contacting member in the other direction opposite to the axial direction of the pivot shaft.

In this case, since the contacting member is held by the restriction member from both sides in the axial direction, large uncontrollable swinging of the contacting member can be more reliably suppressed by the first restriction part and the second restriction part.

(3) In the sound generation mechanism of a third aspect of the present invention according to the first or second aspect, the contacting member is configured to move between an engagement position at which the contacting member engages with the recess-protrusion portion and a non-engagement position at which the contacting member does not engage with the recess-protrusion portion.

In this case, a user may select the position of the contacting member between the engagement position and the non-engagement position. This makes it possible to bring the contacting member to the engagement position and engage the contacting member with the recess-protrusion portion of the rotation member so as to generate sound, and possible to move the contacting member to the non-engagement position so as not to generate sound when sound generation is not necessary. In addition, by arranging the contacting member at an appropriate position between the engagement position and the non-engagement position, it is possible to adjust the engagement state (contact state) between the contacting member and the recess-protrusion portion. In other words, the amount of sound generated by the contacting member may be adjusted. As described above, since the degree of engagement of the contacting member relative to the recess-protrusion portion can be reduced, the contacting member can be used with reduced swinging thereof, thereby making it possible to improve the durability of the sound generation mechanism.

(4) In the sound generation mechanism of a fourth aspect of the present invention according to the third aspect, the restriction member includes a guide hole configured to be passed through by the pivot shaft, the guide hole being configured to guide the contacting member as the contacting member moves between the engagement position and the non-engagement position.

In this case, where the pivot shaft is moved while guided by the guide hole, the contacting member may be moved between the engagement position and the non-engagement position together with the pivot shaft. Since the pivot shaft moves along the guide hole, the pivot shaft moves stably without lateral swing, and the swing of the contacting member may also be stabilized.

(5) In the sound generation mechanism of a fifth aspect of the present invention according to the second aspect, the first restriction part and the second restriction part are preferably provided integrally.

In this case, since the pair of the first restriction part and the second restriction part are integrated, the rigidity of the entire restriction member may be increased, and thus the contacting member may be held more firmly.

(6) In the sound generation mechanism of a sixth aspect of the present invention according to the third or fourth aspect, the contacting member preferably includes a locking portion to be locked to the biasing member in a state in which the contacting member is located at the engagement position.

In this case, the contacting member is held in a state in which the biasing force of the biasing member acts on the locking portion. This makes the contacting member constantly biased by the biasing member, thereby making it possible to suppress significant swinging of the contacting member.

(7) In the sound generation mechanism of a seventh aspect of the present invention according to any one of the first to sixth aspects, the biasing member and the restriction member are preferably provided integrally.

In this case, the biasing member is integrated with the restriction member that is configured to hold the contacting member, and the contacting member can be biased in a stable posture by the biasing member. As a result, it is possible to further reduce uncontrollable movement (rattling) of the contacting member.

Even in a case where the diameter dimension of the spool is changed, it is only necessary to change the pitch of the recess-protrusion portion of the rotation member. Consequently, there is no need to form the biasing member as a separate member corresponding to the diameter dimension of the spool, and there is an advantage in that the number of components can be further reduced.

(8) In the sound generation mechanism of an eighth aspect of the present invention according to any one of the first to seventh aspects, the sound generation mechanism further includes a holding member configured to be locked to one end of the pivot shaft and to hold the restriction member.

In this case, the movement of the restriction member in the axial direction of the pivot shaft may be restricted by the holding member. As discussed above, the movement of the contacting member in the axial direction is more reliably restricted by the restriction member and the holding member.

(9) A dual-bearing reel for fishing according to a ninth aspect of the present invention includes the sound generation mechanism of any one of the first to eighth aspects.

According to the present invention, a dual-bearing reel for fishing having the effects of the above-described sound generation mechanism may be provided.

With the sound generation mechanism and the dual-bearing reel for fishing according to the present invention, it is possible to suppress detachment or damage of the retaining ring due to movement of the contacting member.

BRIEF DESCRIPTION OF THE DRAWING FIGURES

DETAILED DESCRIPTION

Figure 1:
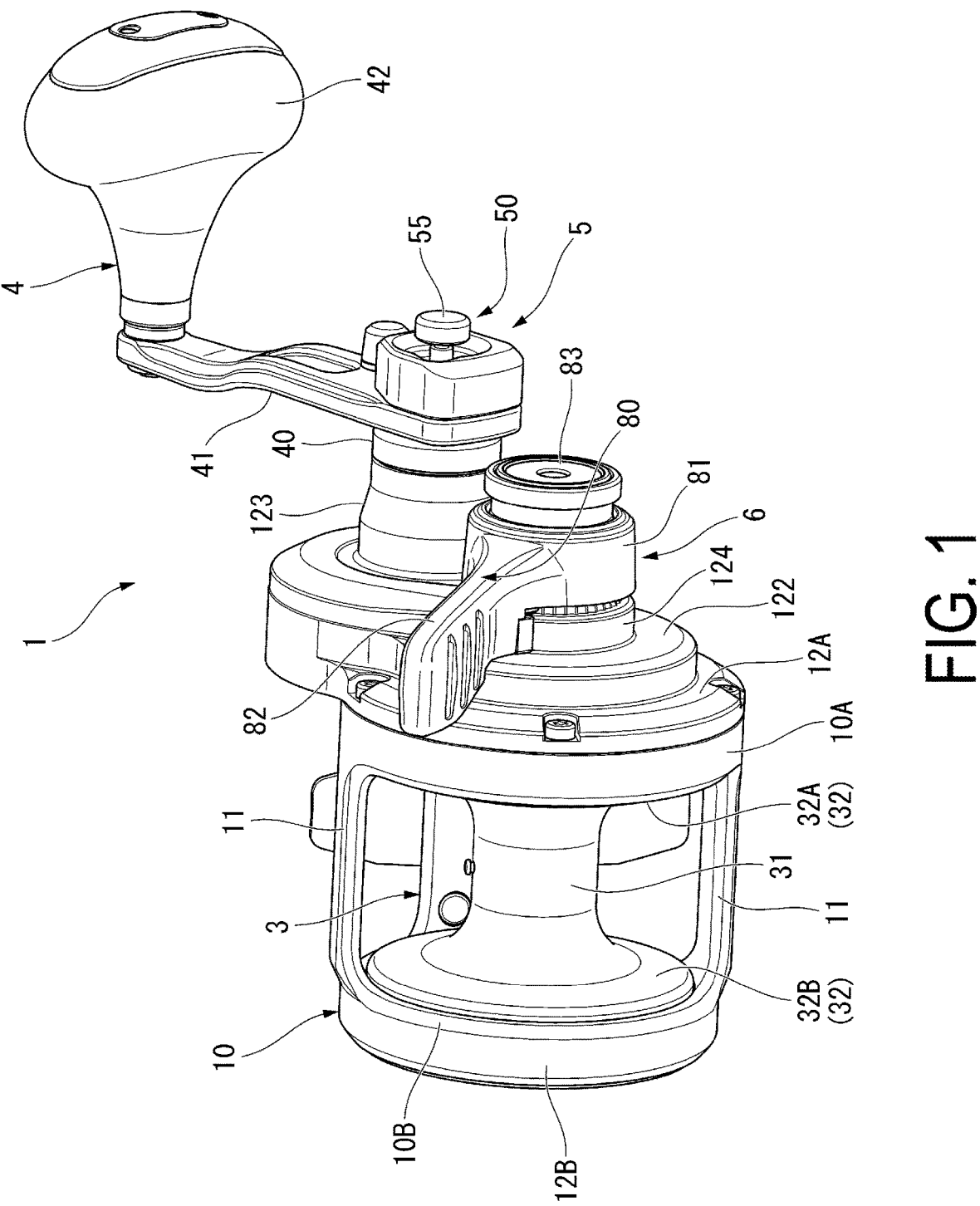
FIG. 1 is a diagram illustrating an embodiment of the present invention and is a perspective view of a dual-bearing reel.

Hereinafter, an embodiment of a sound generation mechanism and a dual-bearing reel for fishing according to the present invention will be described with reference to the drawings. Note that, in the drawings, the scale of each constituent member may be appropriately changed as necessary so that each constituent member has a visible size. In the present embodiment, as a dual-bearing reel for fishing, a dual-bearing reel will be cited as an example and described.
Overall Configuration As illustrated in FIGS. 1 and 2, a dual-bearing reel for fishing (hereinafter referred to as a dual-bearing reel 1) of the present embodiment is a medium-sized lever drag reel that can wind a fishing line.

Figure 3:
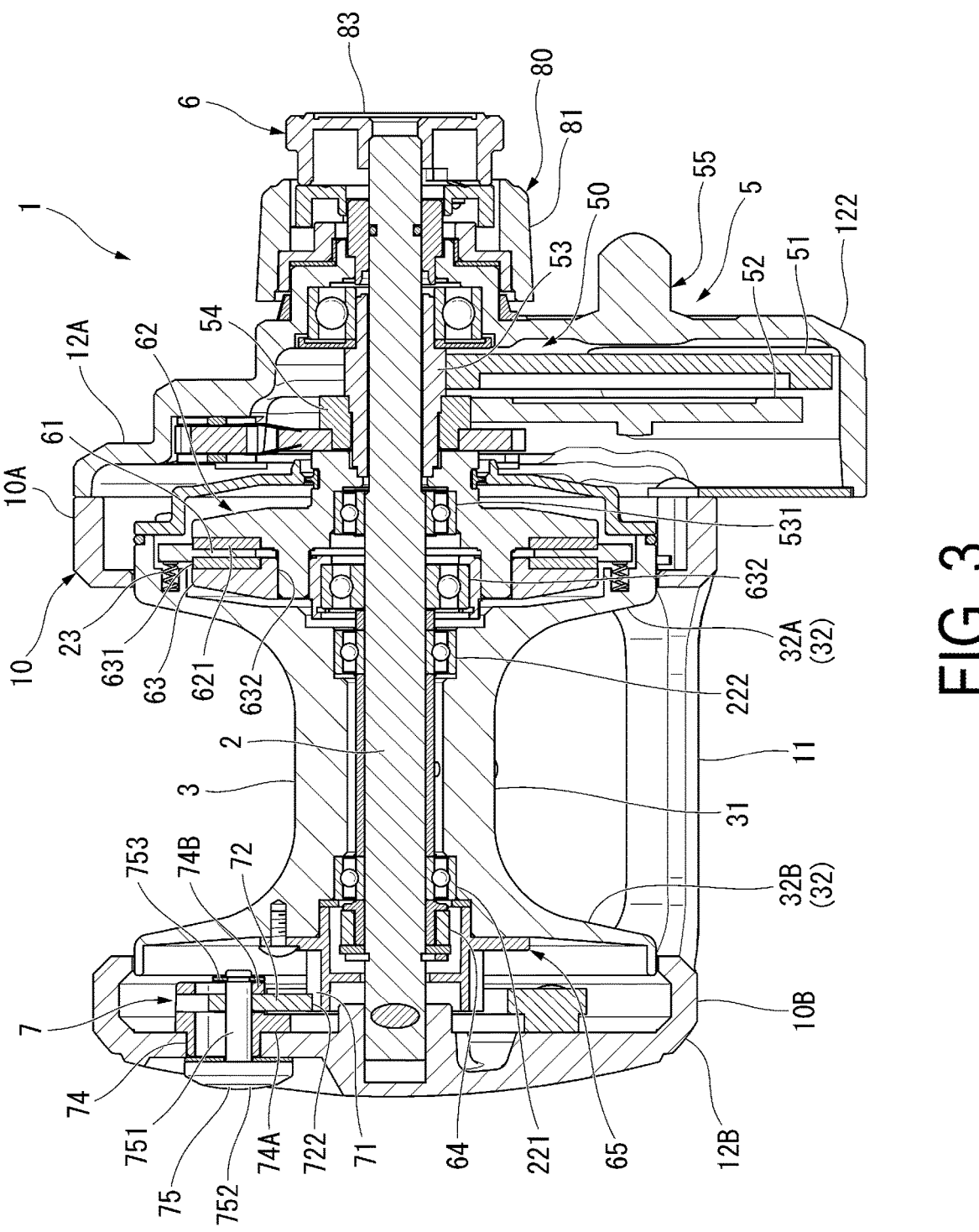
FIG. 3 is a cross-sectional view of the dual-bearing reel illustrated in FIG. 1.
Figure 4:
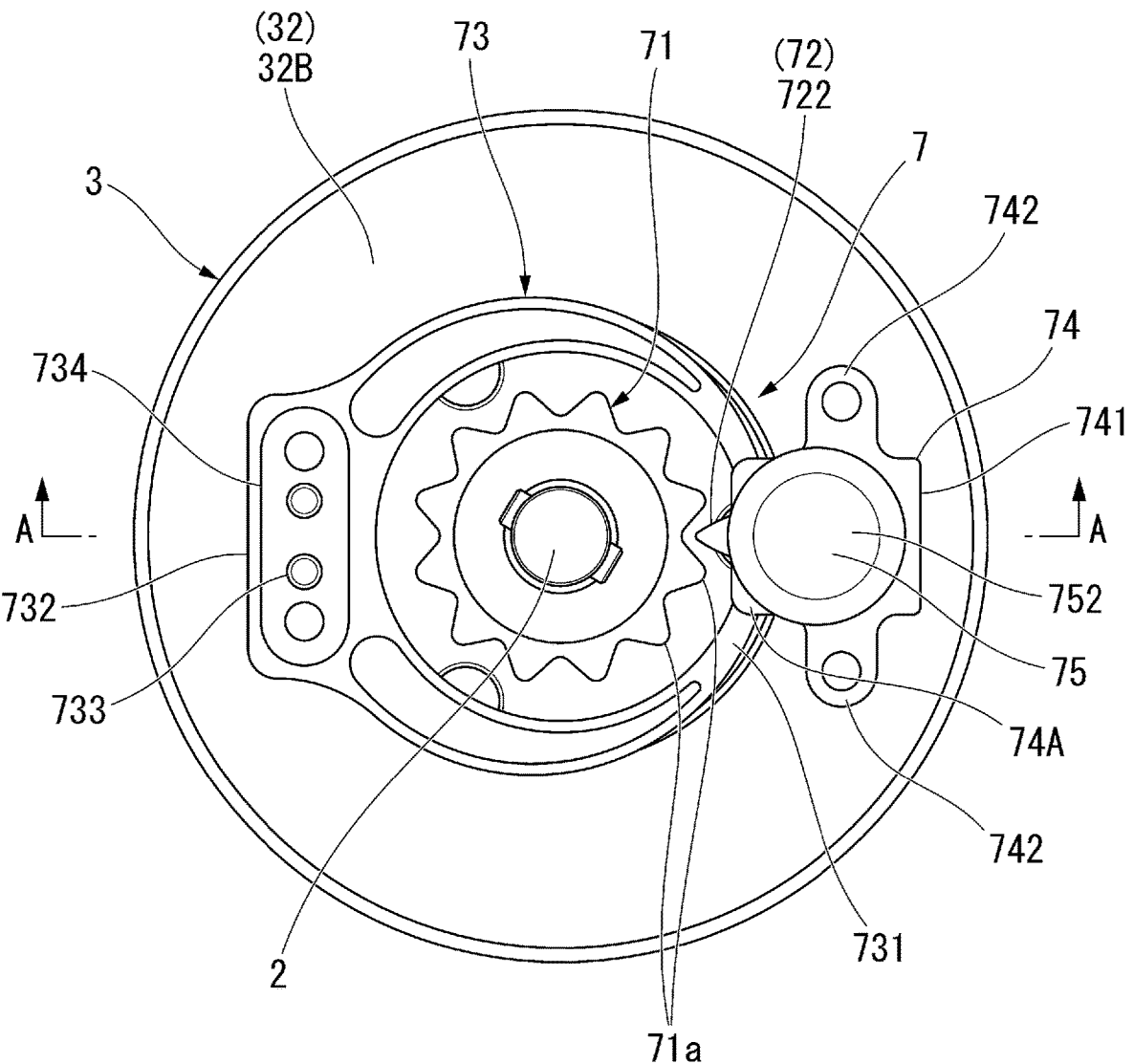
FIG. 4 is a plan view illustrating a configuration of a sound generation mechanism.
Figure 5:
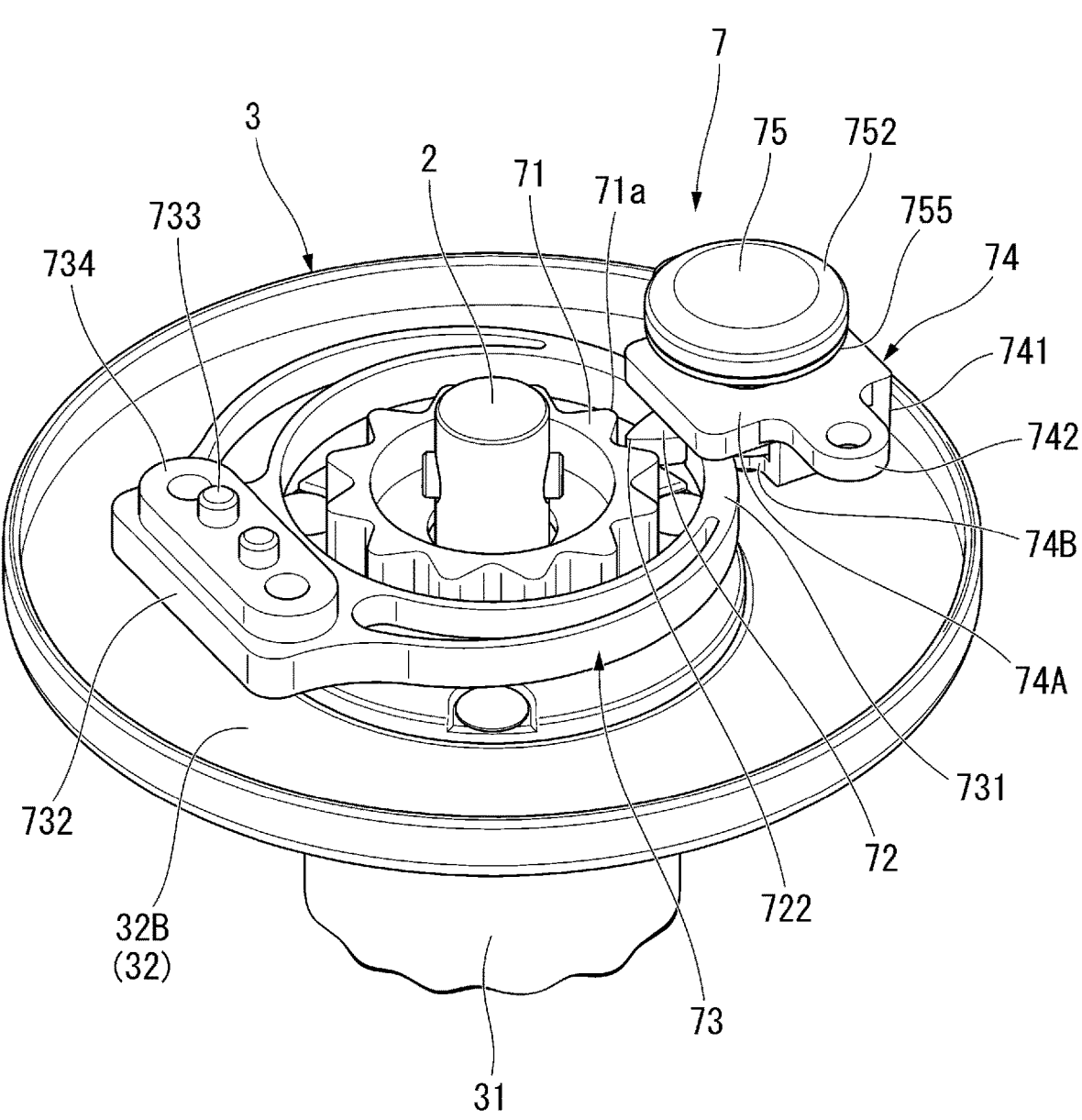
FIG. 5 is a perspective view of the sound generation mechanism illustrated in FIG. 4.
Figure 6:
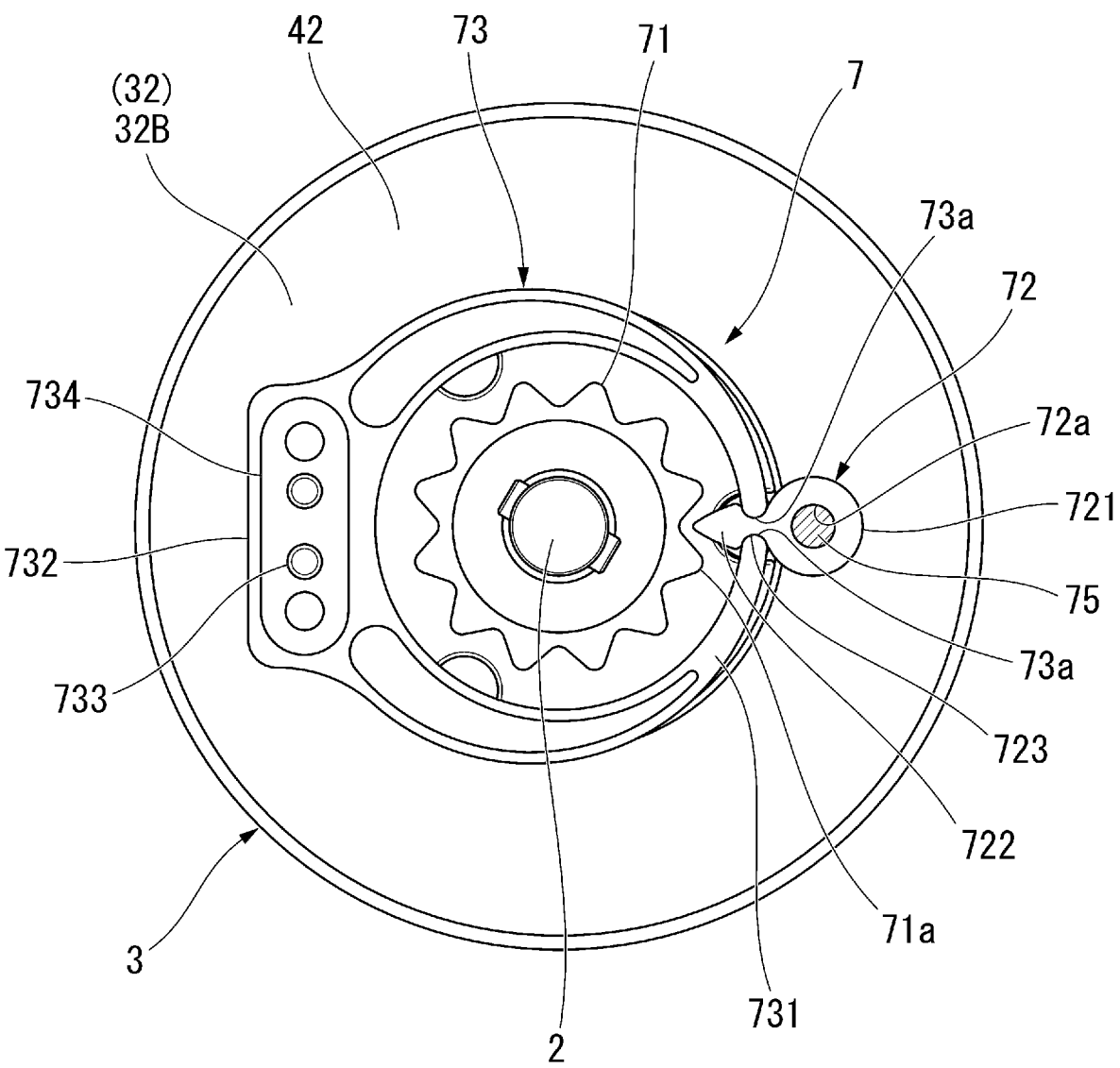
FIG. 6 is a plan view illustrating a configuration of a sound generation mechanism.
Figure 7:
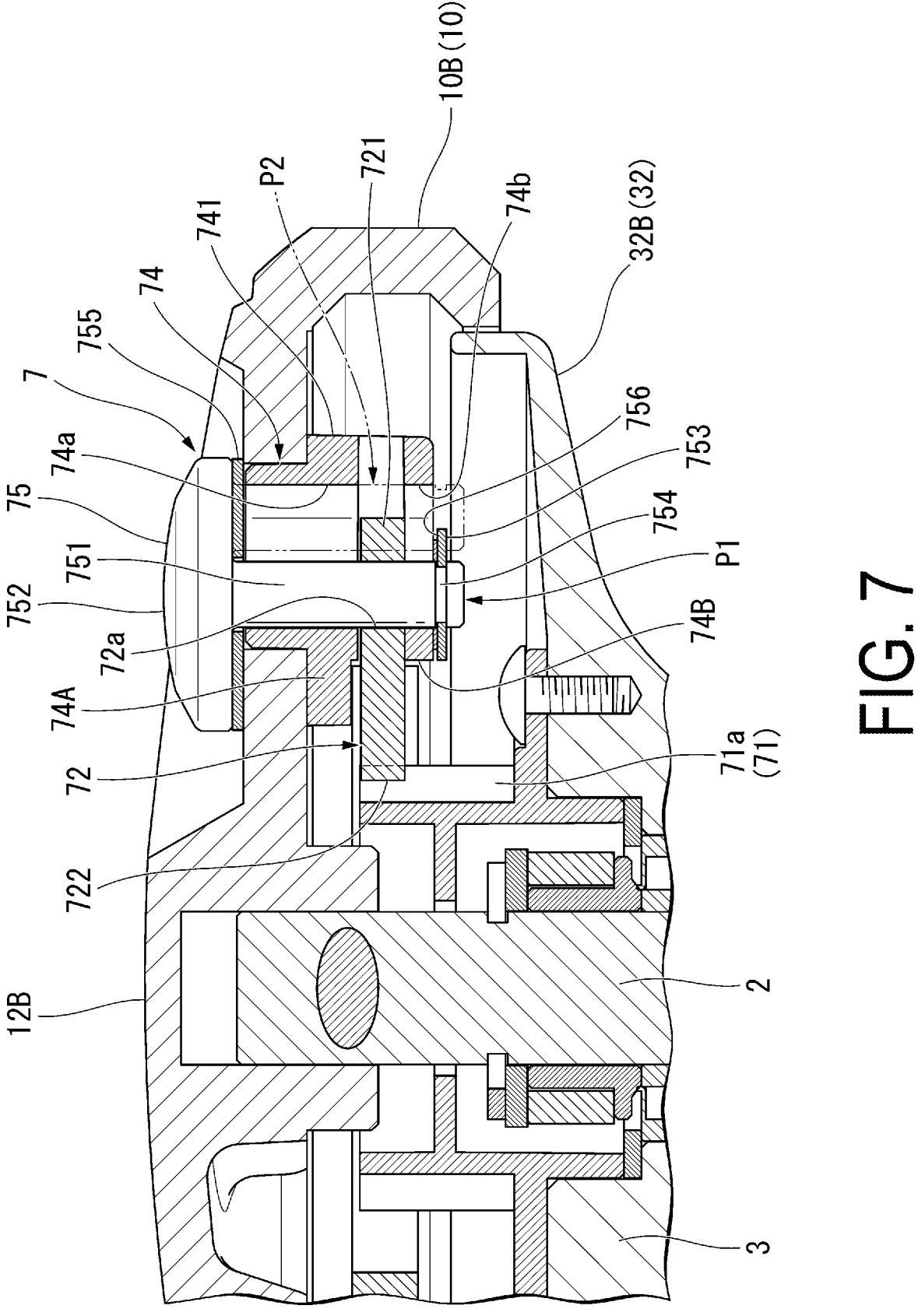
FIG. 7 is a cross-sectional view of a main part of a sound generation mechanism.
Figure 8:
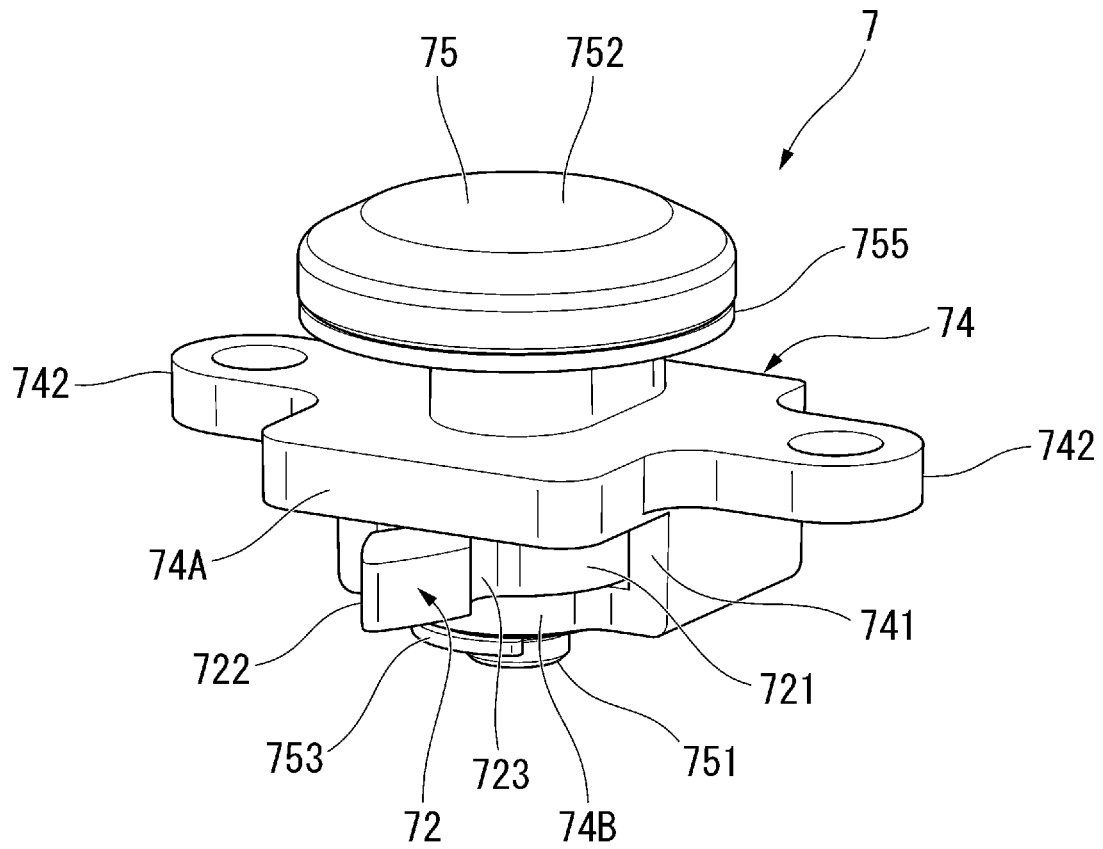
FIG. 8 is an enlarged perspective view of a contacting member.

The dual-bearing reel 1 includes a reel body 10 formed in a tubular shape, a spool shaft 2 attached to a central portion of the reel body 10 to be non-rotatable and to be movable in an axial direction, a spool 3 supported by the spool shaft 2 to be rotatable and to be immovable in the axial direction, and a handle 4 disposed lateral to the reel body 10. As illustrated in FIG. 3, the dual-bearing reel 1 includes, inside the reel body 10, a rotation transmission mechanism 5 configured to transmit the rotation of the handle 4 to the spool 3, and a drag mechanism 6 configured to brake the rotation in a reel-out direction of the spool 3.
Reel Body The reel body 10 includes a right side plate 10A and a left side plate 10B, which are formed in a disc-like shape, made of metal, and paired with each other; a plurality of coupling portions 11 coupling the right side plate 10A and the left side plate 10B at the front and rear, and at a lower portion; a right cover member 12A covering the outer side of the right side plate 10A; and a left cover member 12B formed integrally with the left side plate 10B to cover the outer side of the left side plate 10B.

The coupling portion 11 is integrally formed with a rod mounting portion 13 for mounting the dual-bearing reel 1 on a fishing rod. The right side plate 10A, the left side plate 10B, the coupling portion 11, and the left cover member 12B are integrally formed by metal-cutting.

Figure 2:
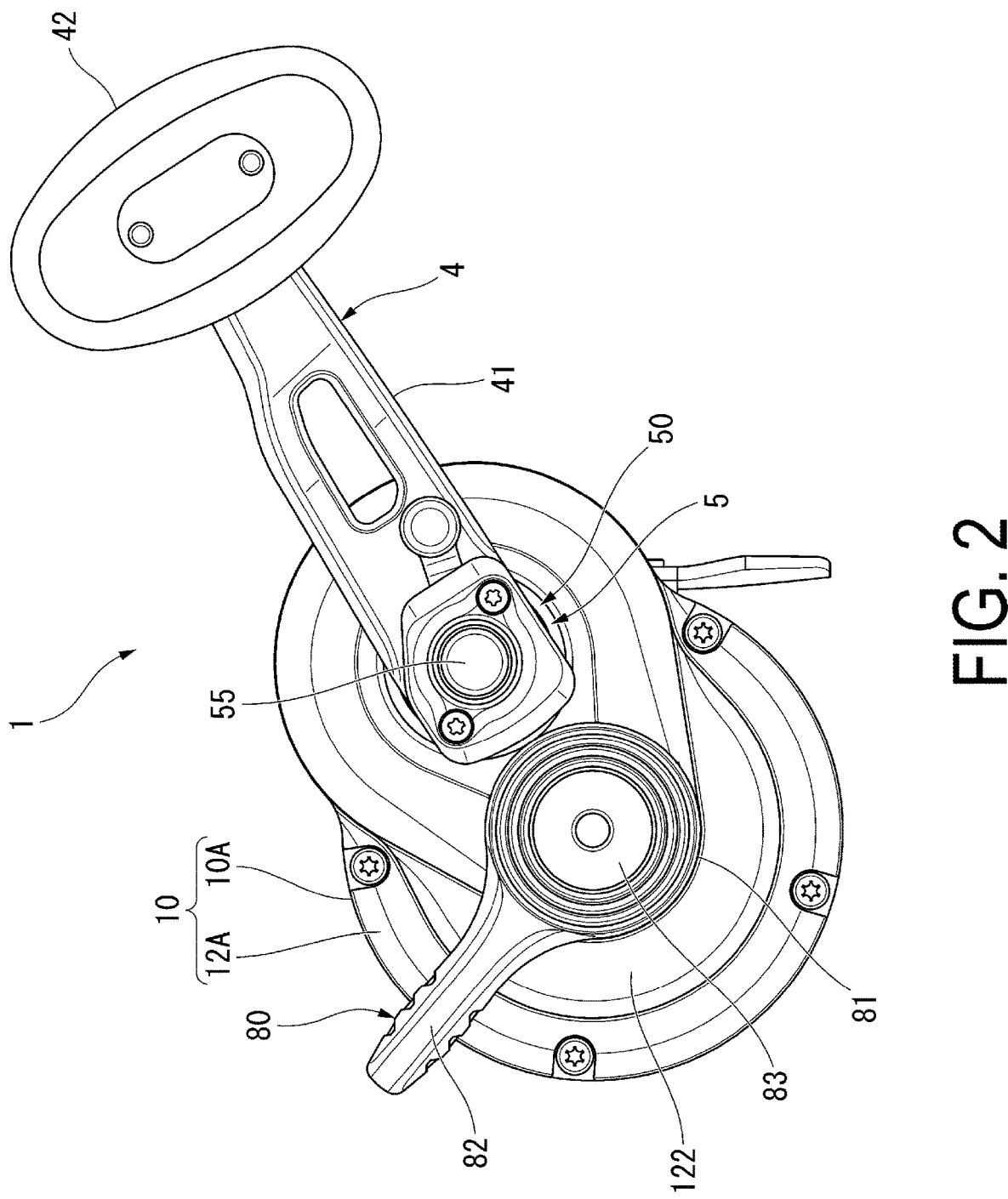
FIG. 2 is a side view of the dual-bearing reel illustrated in FIG. 1 as seen from the side of the handle.

As illustrated in FIG. 1, the right cover member 12A is made of metal and covers the outer side of the right side plate 10A. The right side plate 10A and the left side plate 10B have openings through which the spool 3 can pass. Inside the left cover member 12B, there is formed a boss portion (not illustrated) configured to support the left end of the spool shaft 2 in such a manner that the spool shaft 2 is movable in the axial direction and non-rotatable. Inside the left cover member 12B, as illustrated in FIG. 3, there is provided a sound generation mechanism 7 configured to generate sound in response to the rotation of the spool 3 (see FIGS. 4 to 9).

As illustrated in FIGS. 1 and 2, a bulge portion 122 projecting in a radial direction and also projecting outward in the axial direction is formed on the right cover member 12A on the handle 4 side. As illustrated in FIG. 3, the rotation transmission mechanism 5 is provided to the bulge portion 122. A first support tubular portion 123 for supporting a handle shaft 40 of the handle 4 and a second support tubular portion 124 for supporting a drag lever 80 are formed on the bulge portion 122. Each of the first support tubular portion 123 and the second support tubular portion 124 is formed to protrude outward in the axial direction.

Spool Shaft

As illustrated in FIG. 3, the spool shaft 2 is supported by the boss portion (not illustrated) of the left cover member 12B and the right cover member 12A in such a manner that the spool shaft 2 is movable in the axial direction and non-rotatable. The spool shaft 2 rotatably supports the spool 3 by two bearings, i.e., a first bearing 221 and a second bearing 222, disposed on an outer peripheral surface of the spool shaft 2. Inward movements of the first bearing 221 and the second bearing 222 are restricted at inner side surfaces thereof in the axial direction by the spool 3 and the spool shaft 2. This makes it possible for the spool shaft 2 and the spool 3 to move integrally in the axial direction. The spool shaft 2 moves together with the spool 3 in the axial direction by the drag mechanism 6.

Spool

As illustrated in FIG. 3, the spool 3 includes a bobbin trunk portion 31 and flange portions 32 integrally formed at both ends of the bobbin trunk portion 31. A drag disc 61 constituting the drag mechanism 6 is fixed to an end surface of the flange portion 32A on the right side by a screw.

Handle

As illustrated in FIG. 1, the handle 4 is fixed to a protruding end of the tubular handle shaft 40 disposed below the spool shaft 2 and parallel to the spool shaft 2. The handle shaft 40 is rotatably supported by the reel body 10. As illustrated in FIGS. 1 and 2, the handle 4 includes a handle arm 41 with a through hole formed therein (not illustrated) in a direction intersecting a longitudinal direction, and a handle grip 42 rotatably mounted on an end portion of the handle arm 41. The handle arm 41 is a plate-like member made of a metal, and the handle shaft 40 is attached in the above-mentioned through hole having a non-circular shape formed in a base end portion of the handle arm 41 in an integrally rotatable manner with the handle arm 41.

Rotation Transmission Mechanism

As illustrated in FIG. 3, the rotation transmission mechanism 5 includes a gear shifting operation mechanism 50 that can switch between two speeds, i.e., high and low speeds. The gear shifting operation mechanism 50 includes a first main gear 51 for high-speed winding and a second main gear 52 for low-speed winding, which are rotatably supported on the handle shaft 40 of the handle 4, a first pinion gear 53 and a second pinion gear 54, which are rotatably mounted on the spool shaft 2 in a state of engaging with the first main gear 51 and the second main gear 52 respectively, an engagement piece (not illustrated) for coupling one of the first main gear 51 and the second main gear 52 to the handle shaft 40 so as to transmit rotation, and an operation shaft 55 for setting the position of the engagement piece to a high-speed position to engage with the first main gear 51 or to a low-speed position to engage with the second main gear 52. The operation shaft 55 is biased outward in the axial direction and toward the second main gear 52 via the engagement piece by a spring member (not illustrated).

The first pinion gear 53 is a tubular member made of a corrosion-resistant metal such as a non-magnetic stainless alloy. The right end of the first pinion gear 53 is rotatably supported by a fourth bearing 531 mounted on the bulge portion 122 at the outer side of the spool shaft 2. The left end of the first pinion gear 53 is engaged with a pinion gear collar 62 of the drag mechanism 6 in an integrally rotatable manner. The second pinion gear 54 is a tubular member made of the same material as that of the first pinion gear 53, and the left end thereof is engaged with the drag disc 62 in an integrally rotatable manner. The engagement piece is non-rotatably disposed in a slit of the handle shaft 40.

As illustrated in FIG. 1, the operation shaft 55 is inserted through a through hole of the handle shaft 40. An end portion of the operation shaft 55 on the right side in FIG. 3 protrudes outward in the axial direction from the handle arm 41 (rightward in FIG. 3), and the operation shaft 55 can be pushed leftward in FIG. 3. The operation shaft 55 is freely supported in the axial direction by a nut member (not illustrated) for fixing the handle 4, which is screwed into the protruding end of the handle shaft 40, to the handle shaft 40.

Drag Mechanism

As illustrated in FIG. 3, the drag mechanism 6 includes: the drag disc 61 non-rotatably mounted on the spool 3; the pinion gear collar 62 to which rotation from the handle 4 is transmitted, disposed facing a first surface on the handle 4 side of the drag disc 61, and immovable in a spool shaft direction; a drag receiver 63 to which rotation from the handle 4 is transmitted, disposed facing a second surface on the side opposite to the handle 4 side of the drag disc 61, and movable in the spool shaft direction in conjunction with the spool shaft 2; a biasing member 64 configured to bias the drag disc 61 and the drag receiver 63 in directions away from each other; and a movement mechanism 65 for reciprocating the spool shaft 2 in the axial direction.

The drag disc 61 is a disc-shaped brake disc made of stainless steel and rotates together with the spool 3. The drag disc 61 extends toward the inner side in the radial direction of the spool shaft 2 from the outer peripheral portion of the flange portion 32A on the handle side (right side) of the spool 3. A coil spring 23 is interposed between the flange portion 32A on the right side of the spool 3 and the drag disc 61 to separate the drag disc 61 from the right-side flange portion 32A. The coil spring 23 biases the drag disc 61 to the right side along with the rightward movement of the spool 3 until the drag lever 80 reaches an intermediate position between the separation position and the clamping position. At this time, the drag disc 61 is brought into contact with a first friction plate 621 (described below) of the pinion gear collar 62 to generate a frictional force, thereby generating a drag force.

The pinion gear collar 62 forms a disc-shaped disc portion extending from a gear portion (the first pinion gear 53) that rotates together with the rotation of the handle 4 toward the outer side in the radial direction of the spool shaft 2. The pinion gear collar 62 includes the first friction plate 621 facing the first surface 61a of the drag disc 61. The pinion gear collar 62 includes a protrusion (not illustrated) extending toward the drag receiver 63 in the spool shaft direction.

The drag receiver 63 is movable in the spool shaft direction together with the spool shaft 2, and forms the disc-shaped disc portion extending toward the outer side in the radial direction of the spool shaft 2. The drag receiver 63 is rotatable relative to the spool shaft 2 via a third bearing 632. The drag receiver 63 includes a second friction plate 631 facing the drag disc 61. The drag receiver 63 includes a hole (not illustrated) for movable engagement along the protrusion of the pinion gear collar 62, and rotates together with the pinion gear collar 62.

The first friction plate 621 of the pinion gear collar 62 and the second friction plate 631 of the drag receiver 63 are washer-shaped disc members made of a wear-resistant material such as carbon graphite or fiber-reinforced resin, for example, and are fixed to the outer side surfaces by a plurality of mounting bolts disposed at intervals in the circumferential direction.

The biasing member 64 employs a corrugated annular coil spring of a multilayer winding type exhibiting linearity under a high load condition as compared with a disc spring and having a characteristic that a stable drag curve can be obtained.

By swinging the drag lever 80 from the intermediate position between the separation position and the clamping position toward the clamping position, the biasing member 64 presses the drag receiver 63 to the right side by the biasing force of the biasing member 64. With this, the second friction plate 631 of the drag receiver 63 comes into contact with the drag disc 61, which has been in contact with the first friction plate 621 of the pinion gear collar 62, from the left side. That is, the drag disc 61 is clamped between the first friction plate 621 and the second friction plate 631 to generate a frictional force, thereby generating a larger drag force.

Note that the biasing force of the coil spring 23 is smaller than that of the biasing member 64, and acts before the biasing force of the biasing member 64 acts (in a range from the separation position to the intermediate position). Thus, in the drag mechanism 6, the drag force is exerted only by the biasing force of the coil spring 23 in the range from the separation position to the intermediate position, and the drag force is exerted by the biasing force of the biasing member 64 in addition to the biasing force of the coil spring 23 in a range from the intermediate position to the clamping position.

As illustrated in FIG. 3, the movement mechanism 65 moves the spool shaft 2 to the side opposite to the handle side (left side) so that the drag disc 61, the pinion gear collar 62, and the drag receiver 63 are separated from each other in the spool shaft direction in response to the movement of the drag lever 80 from the clamping position side to the separation position side, and the movement mechanism 65 moves the spool shaft 2 to the handle 4 side (right side) so that the pinion gear collar 62 and the drag receiver 63 clamp the drag disc 61 in response to the movement of the drag lever 80 from the separation position side to the clamping position side.

As described above, in the drag mechanism 6, in response to the movement of the drag lever 80 from the separation position to the clamping position side, the spool shaft 2 is moved to the handle 4 side (right side) so that the drag disc 61 is clamped by the pinion gear collar 62 and the drag receiver 63, and the rotation of the spool 3 in the reel-out direction is braked.

To be specific, as illustrated in FIG. 1, the movement mechanism 65 includes the drag lever 80 moveably provided to the second support tubular portion 124 of the right cover member 12A, a pulling mechanism (not illustrated) for pulling and moving the spool shaft 2 to the right in response to the clockwise swing of the drag lever 80 illustrated in FIG. 2, the biasing member 64 for biasing and moving the spool shaft 2 to the left in response to the counterclockwise movement of the drag lever 80, and a drag adjustment knob 83 mounted on the end portion of the spool shaft 2 supported by the second support tubular portion 124 and used for adjusting the braking force of the drag lever 80.

Drag Lever

As illustrated in FIGS. 1 and 2, the drag lever 80 is mounted on the outer peripheral portion of the second support tubular portion 124 of the right cover member 12A moveably between the separation position corresponding to a drag free state in which the spool 3 is freely rotatable and a maximum position (clamping position) corresponding to a maximum drag state of the drag mechanism, and a swing range thereof is restricted in such a manner that the swing is made between the free position and the maximum position.

The drag lever 80 includes a mounting portion 81 moveably (rotatably) mounted on the outer peripheral portion of the second support tubular portion 124 extending outward in the radial direction of the spool shaft 2 and projecting laterally of the right cover member 12A, and an operation portion 82 that extends from the upper surface of the mounting portion 81 toward the end portion (radially outward) and that can moveably operate in a front-rear direction.

The mounting portion 81 is non-rotatably locked to a cam member (not illustrated) constituting the movement mechanism 65, and is configured to move the spool shaft 2 and the spool 3 in the spool shaft direction in response to a swing operation on the operation portion 82. The mounting portion 81 is a tubular portion having a substantially circular outer shape. The spool shaft 2 is attached to a central portion of a side surface of the mounting portion 81, and the drag adjustment knob 83 having a cap shape is mounted on the end portion of the spool shaft 2. The operation portion 82 is integrally formed with the mounting portion 81.

The second support tubular portion 124 is disposed in such a manner as to project from the side surface of the bulge portion 122 of the right cover member 12A. By bringing part of the operation portion 82 into contact with the second support tubular portion 124, the drag lever 80 is positioned at a predetermined drag braking position (in this case, the clamping position).

The operation portion 82 extends from the upper surface of the mounting portion 81 toward the end portion, and is provided to be swingable in the front-rear direction (the front direction is a clockwise direction in FIG. 1, while the rear direction is the counterclockwise direction in FIG. 1).

In the dual-bearing reel 1 configured as described above, the drag lever 80 is swung when the drag force of the drag mechanism 6 is adjusted to be strong or weak. In a case where the drag lever 80 is arranged at a drag release position which is a swing position on the frontmost side in FIG. 1, in the drag mechanism 6, the pinion gear collar 62 and the drag receiver 63 are separated from the drag disc 61 to be in a drag release state, so that the spool 3 becomes freely rotatable. This makes it possible to perform casting. In FIG. 2, in the case where the drag lever 80 is swung clockwise from that position, the drag lever 80 gradually moves outward in the spool shaft direction (rightward in FIG. 3), and the spool shaft 2 and the spool 3 gradually move rightward. As a result, the force with which the pinion gear collar 62 and the drag receiver 63 are pressed against the drag disc 61 increases, and consequently the drag force increases.

Sound Generation Mechanism

As illustrated in FIGS. 4 to 9, the sound generation mechanism 7 can generate sound in response to the rotation of the spool 3. The sound generation mechanism 7 includes a rotation member 71 configured to rotate together with the spool 3 and including a recess-protrusion portion 71*a* formed on an outer peripheral surface along the circumferential direction of the rotation member 71; a contacting member 72 moveably supported relative to a pivot shaft 75 and configured to elastically move relative to the recess-protrusion portion 71*a* of the rotation member 71; a biasing member 73 configured to bias the contacting member 72 to a predetermined position; and a restriction member 74 configured to restrict movement of the contacting member 72 in an axial direction of the pivot shaft 75.

The rotation member 71 is a member that is made of, for example, synthetic resin, is integrally formed with a disc-shaped mounting plate fixed to the spool 3 (in this case, a left flange 32B of the spool 3) with the center of rotation being coaxial with the spool shaft 2, and rotates together with the spool 3. The rotation member 71 includes the recess-protrusion portion 71*a*, where a large number of recesses and protrusions having a gear-tooth shape are formed on the outer circumference.

The axial direction of the pivot shaft 75 is coincident with the left-right direction, that is, set to be parallel to the axial direction of the spool shaft 2. The pivot shaft 75 is supported in a state of being inserted relative to the restriction member 74. The pivot shaft 75 is a member for moving the contacting member 72 illustrated in FIG. 7 between an engagement position and to a non-engagement position. The pivot shaft 75 includes a shaft portion 751, a knob member 752 provided to one end (left end portion) in the axial direction of the shaft portion 751 and located outside the left cover member 12B, and a retaining ring 753 (holding member) locked to the other end (right end portion) of the shaft portion 751 and holding the restriction member 74.

Figure 9:
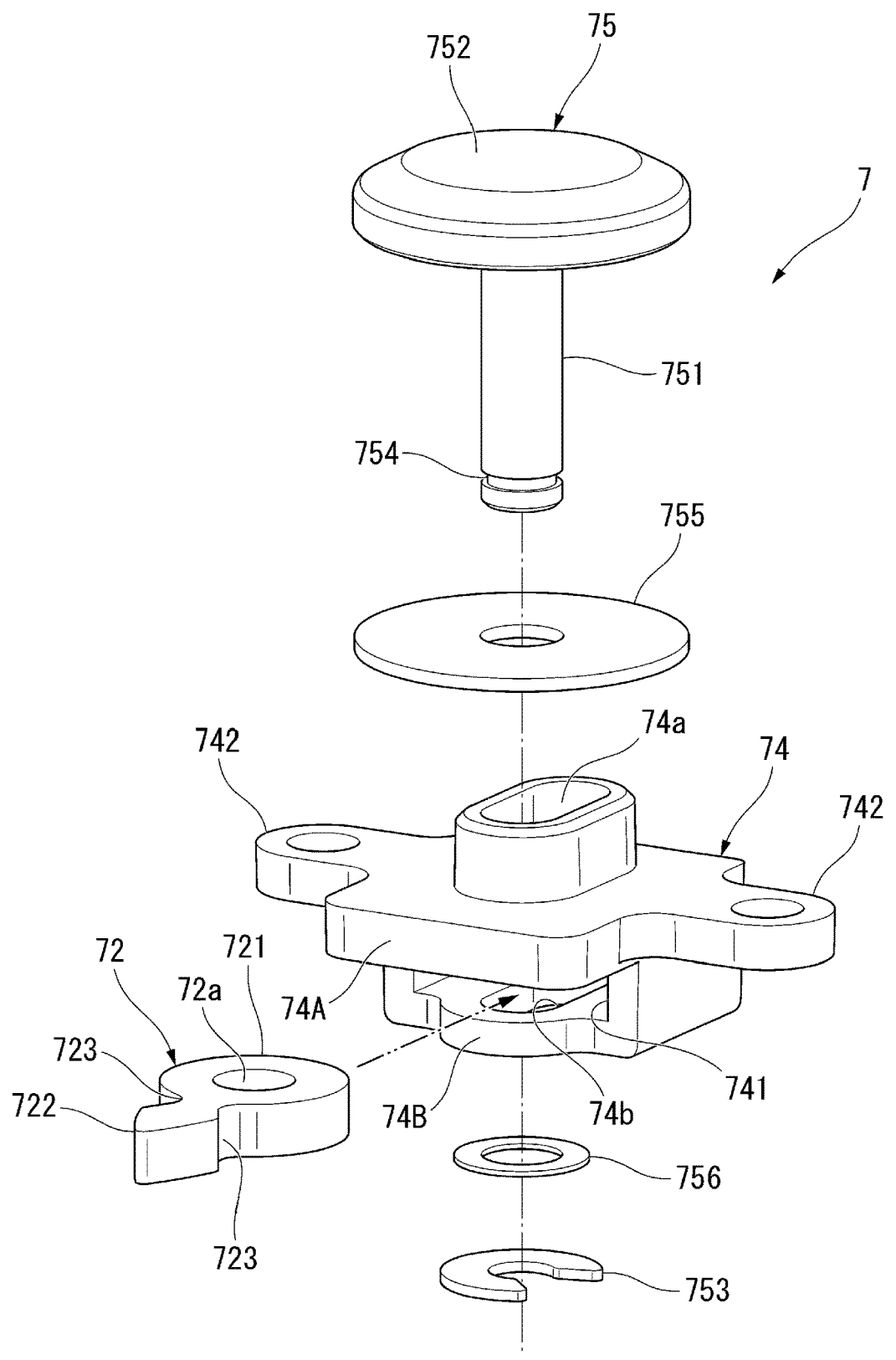
FIG. 9 is an exploded perspective view of the contacting member illustrated in FIG. 8.

The knob member 752 is formed to have a larger diameter than that of the shaft portion 751. As illustrated in FIG. 9, the retaining ring 753 is fittable into a circumferential groove 754 formed along an outer peripheral portion at an end of the shaft portion 751. The retaining ring 753 is supported by the restriction member 74 with a washer 756 interposed therebetween. The shaft portion 751 is guided by a pair of elongated holes 74*a* and 74*b* (described below) formed extending through the restriction member 74. The contacting member 72 is interposed between a first restriction part 74A and a second restriction part 74B of the restriction member 74 and is moveably coupled to the shaft portion 751. In the case where a user operates the knob member 752, the pivot shaft 75 is guided by the elongated holes 74*a* and 74*b* of the restriction member 74, and the contacting member 72, supported by the guided shaft portion 751, may move between the engagement position and the non-engagement position.

The contacting member 72 is made of, for example, synthetic resin, and includes a base end portion 721 moveably supported by the pivot shaft 75; a striking portion 722 extending from the base end portion 721 and having a taper-formed tip, the tip configured to repeatedly collide with the recess-protrusion portion 71*a* of the rotation member 71; and a constricted portion 723 (locking portion) formed between the base end portion 721 and the striking portion 722. The contacting member 72 is movable between the engagement position at which the contacting member 72 engages with the recess-protrusion portion 71*a* and the non-engagement position at which the contacting member 72 does not engage with the recess-protrusion portion 71*a*. When the contacting member 72 is in the engagement position, an opposing portion 73*a* of the biasing member 73 locks the constricted portion 723 from both sides.

In the base end portion 721 of the contacting member 72, a shaft hole 72*a* extends therethrough in a thickness direction. The pivot shaft 75 is inserted into and supported by the shaft hole 72*a* of the contacting member 72. Thus, the contacting member 72 is configured to be swingable about the pivot shaft 75.

The biasing member 73 is made of, for example, synthetic resin, and includes a C-shaped tubular spring portion 731 including the opposing portion 73*a*, and a mounting portion 732 formed in a plate shape at an intermediate location of the spring portion 731. The C-shape is a shape that is obtained by cutting out part of the circumference. The opposing portions 73*a* are paired oppose each other in the cutout portion of the spring portion 731. The spring portion 731 is biased in a direction in which the opposing portions 73*a* in the cutout portion approach each other. The spring portion 731 is provided such that the spring portion 731 can make contact with the constricted portion 723 of the contacting member 72 between the opposing portions 73*a* in a state in which the striking portion 722 is advanced to the engagement position. The mounting portion 732 is fixed between a fixing plate 734 fixed by a screw member 733 and a mounting plate 33.

The restriction member 74 includes the first restriction part 74A configured to restrict the movement of the contacting member 72 to the left side in the axial direction (one direction) of the pivot shaft 75, and the second restriction part 74B configured to restrict the movement of the contacting member 72 to the right side in the axial direction (the other direction) of the pivot shaft 75.

The first restriction part 74A has a plate shape and is disposed on one side (the left side) of the contacting member 72. The second restriction part 74B has a plate shape and is disposed on the other side (the right side) of the contacting member 72. The first restriction part 74A and the second restriction part 74B are disposed parallel to each other with a space interposed therebetween, and are provided integrally with a coupling portion 741. The contacting member 72 is disposed between the first restriction part 74A and the second restriction part 74B. The distance between the first restriction part 74A and the second restriction part 74B is substantially equal to the thickness of the contacting member 72. Each of the first restriction part 74A and the second restriction part 74B is close to or in contact with the contacting member 72. In the first restriction part 74A and the second restriction part 74B, the elongated holes 74*a* and 74*b* (guide holes) are formed at positions overlapping each other in a pivot shaft direction. The pivot shaft 75 is inserted into and supported by the elongated holes 74*a* and 74*b*.

A pair of fixing portions 742 protruding in a plate surface direction is integrally provided to the first restriction part 74A. The pair of fixing portions 742 are disposed on both sides across the first restriction part 74A, and a fixing hole 742*a* is formed in the center of each fixing portion. A bolt (not illustrated) is inserted and fastened into the fixing hole 742*a* to be fixed to the left side plate 10B.

Next, operations of the sound generation mechanism 7 and the dual-bearing reel 1 configured as discussed above will be described in detail with reference to the drawings.

The sound generation mechanism 7 according to the present embodiment is provided to the dual-bearing reel 1 and generates sound when the spool 3 rotates. The sound generation mechanism 7 includes the rotation member 71 configured to rotate together with the spool 3, which includes the recess-protrusion portion 71*a* formed on the outer peripheral surface along the circumferential direction of the rotation member 71; the contacting member 72 moveably supported relative to the pivot shaft 75 and configured to generate sound by elastically moving relative to the recess-protrusion portion 71a of the rotation member 71; the biasing member 73 configured to bias the contacting member 72 to a predetermined position; and the restriction member 74 configured to restrict the movement of the contacting member 72 in the axial direction of the pivot shaft 75.

Thus, the contacting member 72 is biased by the biasing member 73 to be located at the swing center position and is held in a state in which the movement in the axial direction of the pivot shaft 75 is restricted by the restriction member 74. Because of this, the load of the swinging contacting member 72 does not directly act on the retaining ring 753. As described above, according to the present embodiment, the biasing force of the biasing member 73 applied to the contacting member 72 can be reduced to be small, so that large uncontrollable swinging of the contacting member 72 is suppressed by the restriction member 74. As a result, detachment or damage of the retaining ring by the movement of the contacting member 72 in the axial direction of the pivot shaft 75 as in the related art may be suppressed, thereby making it possible to improve the durability as the sound generation mechanism 7.

In the present embodiment, the restriction member 74 includes the first restriction part 74A, configured to restrict the movement of the contacting member 72 in one direction along the axial direction of the pivot shaft 75, and the second restriction part 74B, configured to restrict the movement of the contacting member 72 in the other direction opposite to the axial direction of the pivot shaft 75.

Accordingly, since the contacting member 72 is held by the restriction member 74 from both sides in the axial direction, large uncontrollable swinging of the contacting member 72 can be more reliably suppressed by the first restriction part 74A and the second restriction part 74B.

According to the present embodiment, the contacting member 72 is configured to move between the engagement position in which the contacting member 72 engages with the recess-protrusion portion 71a and the non-engagement position in which the contacting member 72 does not engage with the recess-protrusion portion 71a.

In this case, the user may select the position of the contacting member 72 between the engagement position and the non-engagement position. This makes it possible to bring the contacting member 72 into the engagement position and engage the contacting member 72 with the recess-protrusion portion 71a of the rotation member 71 to generate sound, and to move the contacting member 72 into the non-engagement position so as not to generate sound in a case where sound generation is not necessary. In addition, by arranging the contacting member 72 at an appropriate position between the engagement position and the non-engagement position, it is possible to adjust the engagement state (contact state) between the recess-protrusion portion 71a and the contacting member 72. In other words, the amount of sound generated by the contacting member 72 may be adjusted. As described above, since the degree of engagement of the contacting member 72 relative to the recess-protrusion portion 71a can be reduced to be small, the contacting member 72 can be used with reduced swinging thereof, thereby making it possible to improve the durability as the sound generation mechanism 7.

In the present embodiment, the restriction member 74 includes the elongated holes 74a and 74b configured to be passed through by the pivot shaft 75, the elongated holes 74a and 74b being configured to guide the contacting member 72 such that the contacting member 72 moves between the engagement position and to the non-engagement position.

Because of this, by moving the pivot shaft 75 while being guided by the elongated holes 74a and 74b, the contacting member 72 may be moved between the engagement position and the non-engagement position together with the pivot shaft 75. Since the pivot shaft 75 moves along the elongated holes 74a and 74b, the pivot shaft 75 stably moves without lateral swing, and the swing of the contacting member 72 may also be stabilized.

In the present embodiment, preferably, the first restriction part 74A and the second restriction part 74B are integral.

Accordingly, since the pair of the first restriction part 74A and the second restriction part 74B are integrated together, the rigidity of the entire restriction member 74 may be increased, and thus the contacting member 72 may be held more firmly.

In the present embodiment, the contacting member 72 includes the constricted portion 723, which is configured to be locked to the biasing member 73 when in the engagement position.

Because of this, the contacting member 72 is held in a state in which the biasing force of the biasing member 73 acts on the constricted portion 723. This makes the contacting member 72 constantly biased by the biasing member 73, thereby making it possible to suppress significant swinging of the contacting member 72.

In the present embodiment, there is provided the retaining ring 753, which is locked to one end of the pivot shaft 75 and holds the restriction member 74.

This makes it possible to restrict the movement of the restriction member 74 in the axial direction of the pivot shaft 75 using the retaining ring 753. As discussed above, the movement of the contacting member 72 in the axial direction is more reliably restricted by the restriction member 74 and the retaining ring 753.

In the sound generation mechanism 7 and the dual-bearing reel 1 configured as discussed above according to the present embodiment, it is possible to suppress the detachment or damage of the retaining ring 753 due to the movement of the contacting member 72.

The embodiment of the present invention has been described thus far, but the above embodiment is given merely as an example and is not intended to limit the scope of the invention. The embodiment may be implemented in other various forms, and various omissions, substitutions, and modifications may be made without departing from the spirit of the invention. The embodiment and modified examples thereof include, for example, those that can be easily conceived by those skilled in the art, those that are substantially the same, and those that fall within an equivalent range.

For example, in the above-described embodiment, although a medium-sized lever drag reel has been described as an example, no such limitation is intended, and the present invention may be applied to any dual-bearing reel as long as the reel is the dual-bearing reel 1 including the sound generation mechanism 7.

Figure 10:
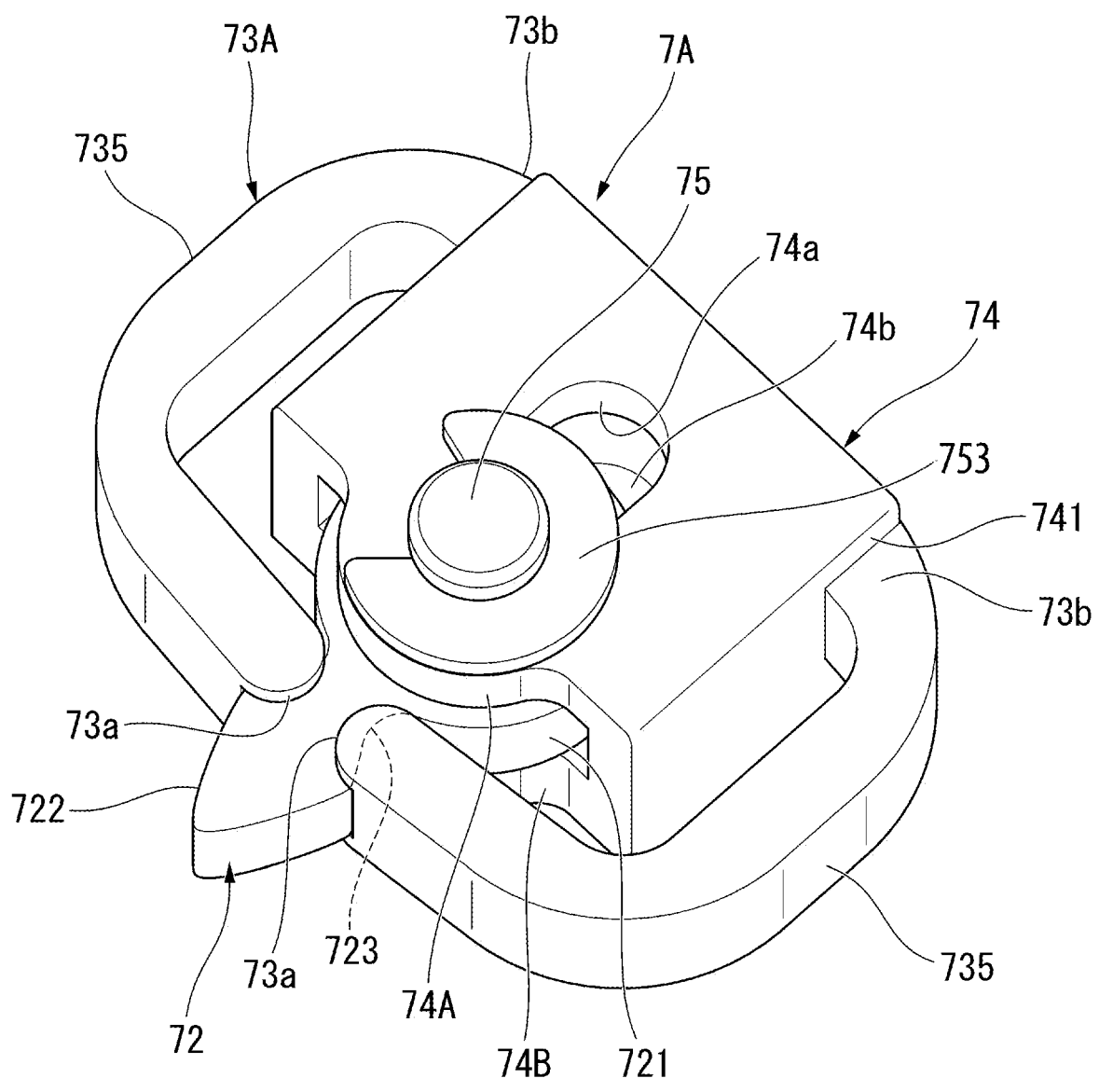
FIG. 10 is a perspective view illustrating a sound generation mechanism according to a modified example.

It is also possible to employ a sound generation mechanism 7A according to a modified example illustrated in FIG. 10. In the sound generation mechanism 7A according to the modified example, a biasing member 73A and the restriction member 74 are integrally provided. The contacting member 72, the restriction member 74, and the pivot shaft 75 have the same configurations as those in the above-described embodiment. The biasing member 73A according to the modified example is fixed to the restriction member 74 such that a pair of halved ring portions 735, which are obtained by halving a ring, face each other in such a manner as to form a ring shape. To be specific, one end (fixed end 73*b*) in an extending direction of each of the pair of halved ring portions 735 is connected to the coupling portion 741 of the restriction member 74. The opposing portion 73*a* at the other end of the halved ring portion 735 is locked to the constricted portion 723 (locking portion) of the contacting member 72.

In the sound generation mechanism 7A according to such a modified example, the biasing member 73A is integrated relative to the restriction member 74 configured to hold the contacting member 72, and the contacting member 72 can be biased in a stable posture by the biasing member 73A. As a result, it is possible to further reduce uncontrollable movement (rattling) of the contacting member 72.

Even in a case where the diameter dimension of the spool 3 is changed, it is only necessary to change the pitch of the recess-protrusion portion 71*a* (see FIG. 6) of the rotation member 71. Consequently, there is no need to form the biasing member 73A as a separate member corresponding to the diameter dimension of the spool 3, and there is thus an advantage, in that the number of components can be further reduced.

In the present embodiment, the restriction member 74 includes the first restriction part 74A and the second restriction part 74B on both sides in the axial direction of the contacting member 72, but the present embodiment is not limited to such a configuration in which the pair of restriction members 74A and 74B are provided. The first restriction part 74A and the second restriction part 74B need not be integrally provided but may be separately provided.

In the above-described embodiment, the pivot shaft 75 and the contacting member 72 are movable between the engagement position at which the contacting member 72 are engaged with the recess-protrusion portion 71*a* of the rotation member 71 and the non-engagement position, but the configuration is not limited to being movable to the non-engagement position as described above. That is, the contacting member 72 may be fixed to the engagement position where the contacting member 72 is engaged with the recess-protrusion portion 71*a* all the time. In this case, elongated holes (guide holes) configured to guide the shaft portion 751 of the pivot shaft 75 may be omitted in the restriction member 74.

In the present embodiment, the constricted portion 723 (locking portion), to which the opposing portion 73*a* of the biasing member 73 is locked, is provided to the contacting member 72, but the locking portion may be at any other location, and is not limited to the constricted shape as in the present embodiment. For example, the opposing portion 73*a* of the biasing member 73 may be locked to the striking portion 722 of the contacting member 72.

REFERENCE SIGNS LIST

1 Dual-bearing reel (Dual-bearing reel for fishing)
2 Spool shaft
3 Spool
4 Handle
6 Drag mechanism
7 Sound generation mechanism 71 Rotation member
71*a* Recess-protrusion portion
72 Contacting member
721 Base end portion
722 Striking portion
723 Constricted portion (Locking portion)
73 Biasing member
74 Restriction member
74A First restriction part
74B Second restriction part
75 Pivot shaft
753 Retaining ring (Holding member)
80 Drag lever

What is claimed is:

1. A sound generation mechanism provided to a dual-bearing reel for fishing and configured to generate sound in a case where a spool rotates, the sound generation mechanism comprising:
   a rotation member configured to rotate together with the spool and including a recess-protrusion portion formed on an outer peripheral surface along a circumferential direction of the rotation member;
   a contacting member moveably supported relative to a pivot shaft and configured to elastically move relative to the recess-protrusion portion of the rotation member;
   a biasing member configured to bias the contacting member to a predetermined position; and
   a restriction member configured to restrict movement of the contacting member in an axial direction of the pivot shaft, the restriction member having a first plate on one axial side of the contacting member and a second plate axially on another axial side of the contacting member.

2. The sound generation mechanism according to claim 1, wherein the first plate of the restriction member and the second plate of the restriction member are integral with one another.

3. The sound generation mechanism according to claim 1, wherein the contacting member is configured to move between an engagement position in which the contacting member engages with the recess-protrusion portion and a non-engagement position in which the contacting member does not engage with the recess-protrusion portion.

4. The sound generation mechanism according to claim 3, wherein the restriction member includes a guide hole configured to be passed through by the pivot shaft, the guide hole being configured to guide the contacting member such that the contacting member moves between the engagement position and the non-engagement position.

5. The sound generation mechanism according to claim 3, wherein the contacting member includes a locking portion configured to be locked to the biasing member when the contacting member is in the engagement position.

6. The sound generation mechanism according to claim 1, wherein the biasing member and the restriction member are integral with one another.

7. The sound generation mechanism according to claim 1, further comprising:
   a holding member configured to be locked to one end of the pivot shaft to hold the restriction member.

8. A dual-bearing reel for fishing, comprising:
   the sound generation mechanism according to claim 1.

* * * * *